US012073547B1

(12) United States Patent
Putrams

(10) Patent No.: US 12,073,547 B1
(45) Date of Patent: Aug. 27, 2024

(54) SYSTEM AND A METHOD FOR INSPECTION OF ROTATING WIND TURBINE BLADE

(71) Applicant: AERONES, INC., San Jose, CA (US)

(72) Inventor: Janis Putrams, Riga (LV)

(73) Assignee: AERONES, INC., San Jose, CA (US)

( * ) Notice: Subject to any disclaimer, the term of this patent is extended or adjusted under 35 U.S.C. 154(b) by 0 days.

(21) Appl. No.: 18/687,153

(22) PCT Filed: Sep. 9, 2022

(86) PCT No.: PCT/LV2022/050009
§ 371 (c)(1),
(2) Date: Feb. 27, 2024

(87) PCT Pub. No.: WO2023/038509
PCT Pub. Date: Mar. 16, 2023

(30) Foreign Application Priority Data

Sep. 12, 2021 (LV) .............................. P2021000055

(51) Int. Cl.
G06T 7/00 (2017.01)
G01C 3/02 (2006.01)
(Continued)

(52) U.S. Cl.
CPC .............. G06T 7/0002 (2013.01); G01C 3/02 (2013.01); G06T 7/70 (2017.01); H04N 23/695 (2023.01)

(58) Field of Classification Search
None
See application file for complete search history.

(56) References Cited

U.S. PATENT DOCUMENTS 8,270,667 B2 * 9/2012 Fritz ...................... F03D 80/50
382/254
11,258,952 B2 2/2022 Kaufmann et al.
(Continued)

FOREIGN PATENT DOCUMENTS

| EP | 2887030 B1 | 11/2016 |
| WO | 2012003372 A2 | 1/2012 |
| WO | 2019081543 A1 | 5/2019 |

OTHER PUBLICATIONS

Ilja Kaufmann et. al. Remote laser vibrometry for wind turbine blades; Jan. 4, 2016, SPIE).

(Continued)

Primary Examiner — Edemio Navas, Jr.
(74) Attorney, Agent, or Firm — Brooks Kushman P.C.

(57) ABSTRACT

A rotating wind turbine blade optical inspection devices and systems. The system for inspection, having: a camera; a rotatable device designed to controllably rotate camera along axis, not camera's lens axis of rotational symmetry; a laser distance sensor or a dynamic vision sensor and a computer system; the camera, the rotatable device and the laser distance sensor or the dynamic vision sensor operably connected with the computer system; wherein the camera is adapted to be mounted on the rotatable device; the distance or the vision sensors' optical axis is directed at a set distance from the camera's optical axis; wherein the computer system: (i) to receives a signal from the distance or vision sensors; (ii) to determines camera's activation time based on the signal from the distance sensor or vision sensors and a pre-set adjustable delay time; (iii) to activate the camera acquiring an image of a blade area inspected.

13 Claims, 3 Drawing Sheets

(51) Int. Cl.
*G06T 7/70* (2017.01)
*H04N 23/695* (2023.01)

(56) References Cited

U.S. PATENT DOCUMENTS

| | | | |
|---|---|---|---|
| 2005/0270519 A1* | 12/2005 | Twerdochlib | G01P 3/488 |
| | | | 356/24 |
| 2019/0085821 A1* | 3/2019 | Ando | F03D 7/047 |
| 2019/0272424 A1 | 9/2019 | Lambert et al. | |
| 2021/0003114 A1* | 1/2021 | Wang | G06T 7/60 |
| 2021/0040939 A1* | 2/2021 | Lucks | F03D 17/00 |

OTHER PUBLICATIONS

International Search report for PCT/LV2022/050009, prepared by the European Patent Office, mailing date Nov. 25, 2022, 4 pages.

* cited by examiner

SYSTEM AND A METHOD FOR INSPECTION OF ROTATING WIND TURBINE BLADE

CROSS-REFERENCE TO RELATED APPLICATION

This application is the U.S. national phase of PCT Application No. PCT/LV2022/050009 filed on Sep. 9, 2022, which claims priority to LV Patent Application No. LVP2021000055 filed on Sep. 12, 2021, the disclosures of which are incorporated in their entirety by reference herein.

TECHNICAL FIELD

The invention relates to rotating wind turbine blade optical inspection devices and systems, more particularly, to the system for inspection of moving wind turbine blade.

BACKGROUND ART

Wind turbines are built in bigger numbers and also become bigger in size. Blades are a vital part of wind turbine. Bird strikes, lightning strikes, leading edge and surface erosion cause damage to wind turbine blades. Damaged, faulty, dirty, or covered by ice wind turbine blades can reduce overall productivity of the wind turbine. Thus, in the course of use wind turbine blades require regular inspection and maintenance.

Under many prior art methods, wind turbines are required to be stopped to perform visual inspection. Most typical inspection methods are manual: using industrial climbers or drones and ground based.

There is known a method for use of a laser Doppler vibrometer in a camera-based tracking system to survey the vibrations of rotor blades during normal operation of a power plant (Ilja Kaufmann et. al. Remote laser vibrometry for wind turbine blades; 01.04.2016, SPIE). Under the known method the optics of the laser Doppler vibrometer is mounted on a pan-tilt unit that is controlled by a camera-based tracking system.

There is also known a method and device for measuring oscillations of a moving object (EP2887030). The device for measuring oscillations of a moving object comprises at least one laser, which is designed to emit laser radiation, and at least one camera, which is designed to detect the moving object, and at least one receiver, which is designed to detect at least part of the laser radiation, wherein the laser radiation can be directed by means of a beam guidance apparatus and the device also contains at least one tracking apparatus, which can be supplied at least with image data of the camera and by means of which at least one control signal of the beam guidance apparatus can be produced.

There is also known a device and a method for the optical monitoring of moving components (WO 2019081543 A1). The known device having at least one first camera, the image detection region of which can be influenced by a tracking device and which is configured to record at least one image of at least part of the component to be monitored. The device further has at least one second camera, which is configured to detect at least one image of the component to be monitored. The device further has an open-loop or closed-loop control unit, to which image data of the second camera can be provided and by means of which an open-loop or closed-loop control signal can be generated and provided to the tracking device.

Although the known methods and devices make it possible to perform wind turbine blade inspection without the need to stop wind turbines, which minimizes downtime of the wind turbine and reduces costs of inspection, the known solutions are still relatively insufficiently effective.

SUMMARY OF THE INVENTION

A system for inspection of rotating wind turbine blade, comprising: a camera; a rotatable means, designed to controllably rotate camera along axis, which is not camera's lens axis of rotational symmetry; at least one laser distance sensor, or a dynamic vision sensor and a computer system; the camera, the rotatable means and the laser distance sensors or the dynamic vision sensor operably connected with the computer system; wherein the camera is adapted to be mounted on the rotatable means; the laser distance sensor's, or the dynamic vision sensor's optical axis is directed at a set distance from the camera's optical axis; wherein the computer system is configured:
(i) to receive a signal from the laser distance sensor, or the laser distance sensors, or the dynamic vision sensors;
(ii) to determine camera's activation time based on the signal received from the laser distance sensor, or the laser distance sensors, or the dynamic vision sensors and a pre-set adjustable delay time; (iii) to activate the camera to acquire an image of a blade area, which needs to be inspected.

The claimed system and method for inspection of rotating wind turbine blade is further set forth in the claims and the description and illustrated on the following drawings.

DETAILED DESCRIPTION OF THE INVENTION

Figure 1:
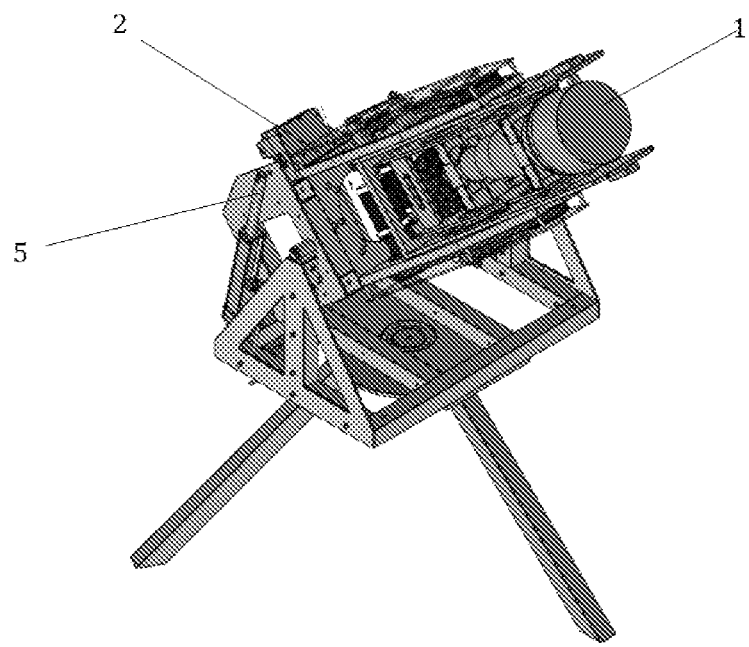
FIG. 1 shows front perspective view of the camera on rotatable means.
Figure 2:
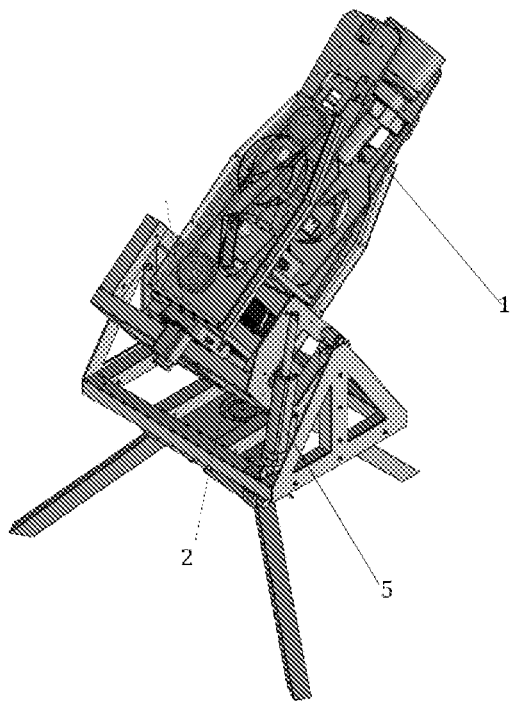
FIG. 2—back perspective view of the camera on rotatable means.
Figure 3:
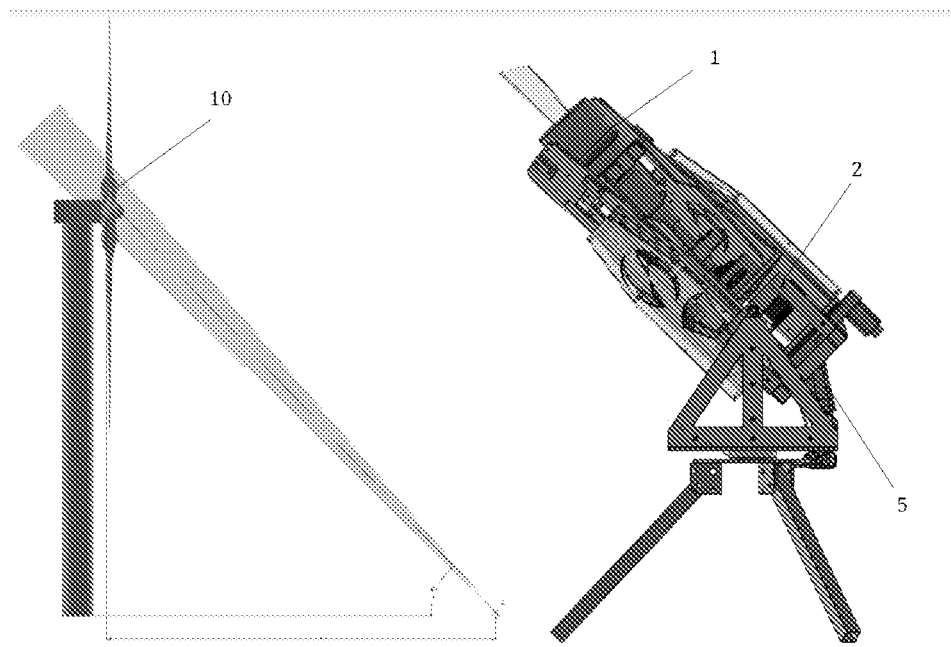
FIG. 3—a schematic general view of the embodiment of the device pointing on a segment of a wind turbine blade.
Figure 4:
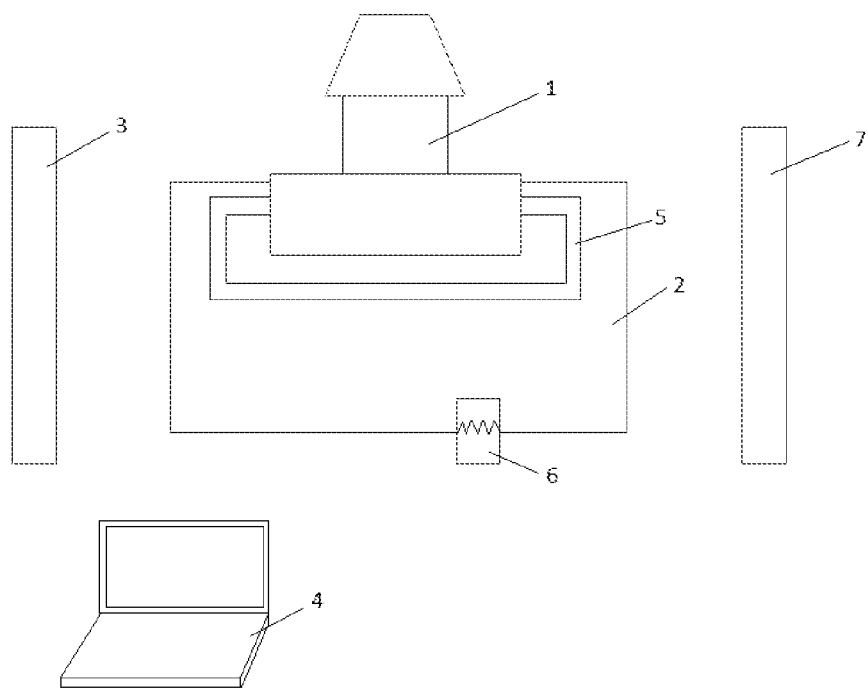
FIG. 4—a schematic representation of the claimed device.

The proposed system for inspection of rotating wind turbine blade, comprises: a camera 1; a rotatable means 2 designed to controllably rotate camera 1 along axis, which is not camera's 1 lens axis of rotational symmetry; a at least one laser distance sensor, or a dynamic vision sensors 3 and a computer system 4; the camera 1, the rotatable means 2 and the at least one laser distance sensor, or a dynamic vision sensors 3 operably connected with the computer system 4; wherein the camera 1 is adapted to be mounted on the rotatable means 2; at least one laser distance sensor, or the dynamic vision sensors 3 optical axis is directed at a set distance from the camera's 1 optical axis; wherein the computer system 4 is configured: (i) to receive a signal from the at least one laser distance sensor, or a dynamic vision sensors 3; (ii) to determine camera's 1 activation time based on the signal received from the at least one laser distance sensor, or a dynamic vision sensors 3 and a pre-set adjustable delay time; (iii) to activate the camera 1 to acquire an image of a blade area 10, which needs to be inspected.

Wind turbine blade tip speed varies with manufacturer and model but can reach up to 400 km/h. Turbine blade inspection require high enough resolution of photographs. Major wind turbine manufacturers require resolution at least 1 pixel for 1 millimeter. To compete with drone-based inspection quality a resolution of much higher number is needed. To obtain such resolution a telephoto lens is required. Commercially available cameras with high megapixel specification have the fastest shutter speed of about 1/8000 and assuming 400 km/h blade tip speed, the distance travelled during open shutter would be ~14 mm. With picture resolution of 1 px/1 mm this would create unacceptable 14-pixel image blur. To create image without blur a rotating camera system is designed with advanced measurement and control system to synchronize camera linear speed to the wind turbine linear speed.

Rotational speed of the turbine is constant but when viewed from an angle with visual perspective neither the angular speed, nor visual displacement is constant any more during rotation.

Camera lens is set to a particular focus distance and when rotated creates a circular trajectory. This trajectory needs to touch wind turbine blade trajectory at one point where linear speeds of wind turbine blade and camera focus points will be equal. At this point a picture of the inspected blade area is taken. It is good to have this point as close to the camera as possible, because a higher resolution picture can be achieved. This point would be vertically down from the turbine rotational center.

However, this point is not usable when the wind turbine tower blocks the view, e.g. when looking to the blade from the wind turbine's back side. For this reason, an angle is used to avoid the wind turbine tower blocking the view.

Blade inspection needs to be performed from all four sides of the blade. This means that the camera will be moved from one side of the turbine to the other. It will be moved also to the base of the tower to perform blade leading and trailing edge visual inspection. At this time, it is important to keep track which blade relates to which image. For this reason, another device may be used. The device, configured to be stationary all the time and keep track of the A, B and C blade positions at any point in time. This data then can be synchronized to the camera imagery to prepare a full inspection report. To accomplish this a camera can be used with computer aided visual blade recognition.

To avoid vibration during camera rotation the central point of gravity is positioned on the rotational axis. Though camera direction does not point in the same direction as the rotational axis. Because of centrifugal forces this can create an unwanted wobble. To solve this a counterweight is designed that is directed in the opposite direction as the camera points relative to the camera rotational axis.

An optional high-power flash can be used to improve the light conditions for the camera. This highly directional flash is synchronized with the camera shutter and positioning is automatically pointing to the picture taking position. Flash does not need to be rotated as the camera does.

According to the invention, the laser distance sensor 3 used can be either one, or in a set of laser distance sensors, for instance, two or three. The laser distance sensors 3 can be placed on the ground and be directed to a particular place on the wind turbine, or are adapted to dynamically change direction and thus, place on the wind turbine they are directed to. According to another embodiment the laser distance sensors 3 can be fixed to the camera 2 and be configured to rotate together with the camera 2. According to yet another embodiment the laser distance sensors 3 can be fixed to the camera 2 and be configured to be rotated independently from the camera 2 and thus, dynamically change direction and thus, place on the wind turbine they are directed to.

According to yet another embodiment, in addition to, or instead of the laser distance sensors 3, the proposed system may contain the dynamic vision sensors 3, which is an asynchronous imager, designed to respond to changes in brightness, with no "frames" to capture, where individual pixels independently produce an output only if there is a local change in measured brightness, while the image is continuously synthesized form a temporal stream of events.

Captured macro images are, preferably, programmatically checked for noise (blur, foreign matter). The images can be further processed and a profile image of the total blade surface to be inspected is created.

Example of Implementation of the Invention

Figure 5:
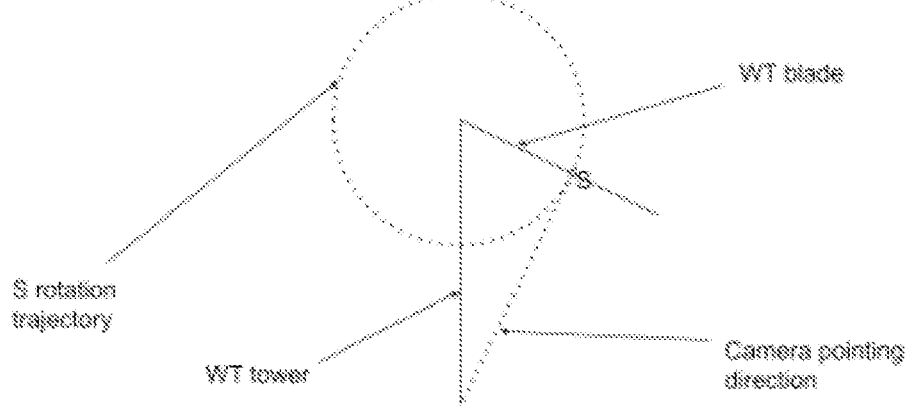
FIG. 5—a schematic representation of the camera placement and acquiring an image of a blade area, which needs to be inspected.

Process description for one blade spot inspection on leading edge or trailing edge. Camera is positioned at the base of the WIND TURBINE tower (FIG. 5). A spot "S" is chosen on leading or trailing edge of the blade that needs to be inspected. Camera is pointed at an angle such that the spot "S" circular trajectory forms tangent with the camera direction. Picture is taken with a fast shutter at the moment when the camera is pointing to the spot "S" of the blade. Additionally, a high-power directional flash can be used to add additional light and achieve faster shutter speed.

Process description for one blade spot inspection on suction side or pressure side.

(i) The camera is positioned in front or back of the wind turbine (FIG. 5), depending where the blade spot "S" is, which needs to be inspected. In front of the wind turbine the preferable position is in the middle, perpendicular to the blade circular trajectory and picture is taken when the "S" blade is vertically pointing down. From the back the tower is in front therefore a minimum angle relative to the tower is chosen so that the "S" can be seen.

(ii) The laser distance sensor is used to measure distance from the camera to the "S" at the wind turbine angle, where pictures will be taken (PA). The dynamic vision sensor can be used instead of the laser distance sensor. Camera focus is adjusted accordingly.

(iii) Camera angles and are adjusted to take a picture at the "S" according to the geometry picture. There are three angles: (a) camera rotation angle that is changing all the time and is kept in synchronized with the wind turbine angle, (b) camera rotation axis angle relative to the ground (c) camera angle relative to the camera rotation axis.

(iv) Laser distance sensor is pointed to a blade (tip is best) at an angle (LA—laser distance sensor angle) that is a fixed angle distance from the PA. This angle is calculated knowing wind turbine max speed change according to wind turbine model and wind conditions. The greater the speed change the smaller the angle should be. For example, 10 degrees before PA. A minimum angle is calculated that gives enough time for the camera mechanism to correct for wind turbine-camera speed and phase difference. If LA is too close to PA the camera mechanism will not have enough time to speed up, slow down and correct for phase difference. If LA is too far from PA then wind turbine speed might drift too far from calculated speed at LA as wind turbine changes its speed all the time.

(v) Wind turbine speed and spot blade angle phase difference to camera angle is calculated when wind turbine blade is sensed at LA.

(vi) A corrective camera motion action is calculated depending on calculated speed and phase difference. The phase is measured to a particular blade which has the "S". There are 4 cases: (a) wind turbine speed is faster than current camera speed and phase is positive; (b) wind turbine speed is faster than current camera speed and phase is negative; (c) wind turbine speed is slower than current camera speed and phase is positive; (d) wind turbine speed is slower than current camera speed and phase is negative.

(vii) Assuming maximum acceleration/deceleration possibilities for camera mechanism, a corrective speed trajectory is calculated for each case and executed.

(viii) Further the computer system programmably determines whether the camera mechanism has achieved specified trajectory in time before the blade reached PA and current blade is the blade with the spot? If yes then proceed to (ix) If not, then proceed with step (v). A picture is taken at PA with high shutter speed.

Multiple laser distance sensors and LA can be chosen to increase measurement and corrective action frequency. This would allow the system to take pictures for fast speed changing wind turbine models. The other option is to improve the camera rotational mechanism to achieve faster acceleration and shorter correction times.

The invention claimed is:

1. A system for inspection of rotating wind turbine blade, comprising: a camera; a rotatable means designed to controllably rotate camera along axis, which is not camera's lens axis of rotational symmetry; at least one laser distance sensor, or dynamic vision sensors and a computer system; the camera, the rotatable means and the at least one laser distance sensor, or the dynamic vision sensors operably connected with the computer system; wherein the camera is adapted to be mounted on the rotatable means; laser distance sensors', or the dynamic vision sensors' optical axis is directed at a set distance from the camera's optical axis; wherein the computer system is configured:
   (i) to receive a signal from the laser distance sensor, or the laser distance sensors, or the dynamic vision sensors;
   (ii) to determine camera's activation time based on the signal received from the laser distance sensor, or the laser distance sensors, or the dynamic vision sensors and a pre-set adjustable delay time;
   (iii) to activate the camera to acquire an image of a blade area, which needs to be inspected;
   (iv) to calculate linear speed of the blade area, which needs to be inspected, on the basis of the signals received from the laser distance sensor, or the laser distance sensors, or the dynamic vision sensors; and
   (v) to adjust the camera's pre-set activation delay time based on the calculated linear speed of the blade area which needs to be inspected.

2. The system according to claim 1, wherein the rotatable means further comprise a pan-tilt mechanism; and the computer system is further configured:
   (i) to calculate the camera's position adjustment based on calculated speed and camera rotational angle difference from target blade rotational angle; and
   (ii) to adjust the camera's position according to the obtained results of the calculations by sending a signal to the pan-tilt mechanism.

3. The system according to claim 1, wherein the computer system is further configured to process the images acquired by the camera to determine whether an anomaly is present in the blade area which needs to be inspected.

4. The system according to claim 3, wherein the computer system is further configured to determine coordinates of a position of the detected anomaly in a coordinate system of the wind turbine or wind turbine blade.

5. The system according to claim 1, wherein the rotatable means are provided with a counterweight, located on the camera's rotational axis.

6. The system according to claim 1, wherein the system further comprises an adjustable flash, configured to improve light conditions for the camera; the flash being connected with the computer system and synchronized with the camera's shutter.

7. A method for inspection of rotating wind turbine blade suction side or pressure side using the system as per claim 1, the method comprising the following steps:
   (i) positioning and directing camera toward a blade area on a suction side or a pressure side, which needs to be inspected, at an angle such that the blade area circular trajectory forms tangent with the camera direction;
   (ii) rotating camera by the rotatable means along axis, which is not camera's lens axis of rotational symmetry;
   (iii) sensing by the laser distance sensor, the laser distance sensors, or the dynamic vision sensors presence of a blade area in the sensor's field of view and communicating the data obtained to the computer system;
   (iv) determining by the computer system the rotating camera's activation time based on the signal received from the laser distance sensor, the laser distance sensors, or the dynamic vision sensors and a pre-set adjustable delay time;
   (v) activating the rotating camera by the computer system to acquire an image of a rotating blade area, which needs to be inspected;
   (vi) processing the images acquired by the camera to determine whether an anomaly is present in the blade area which needs to be inspected;
   (vii) calculating linear speed of the blade area, which needs to be inspected, on the basis of the signals received from the at least one laser distance sensor, or the dynamic vision sensors; and
   (viii) adjusting the camera's pre-set activation delay time based on the calculated linear speed of the blade area which needs to be inspected.

8. The method according to claim 7, further comprising the step of (iia) measuring distance from the camera to the blade area by the laser distance sensor or the laser distance sensors and communicating the data obtained to the computer system; before the step.

9. The method according to claim 7, further comprising the steps of
   (vii) calculating linear speed of the blade area, which needs to be inspected, on the basis of the signals received from the at least one laser distance sensor, or the dynamic vision sensors; and
   (viii) adjusting the camera's pre-set activation delay time based on the calculated linear speed of the blade area which needs to be inspected.

10. The method according to claim 7, further comprising the steps of
    (i) calculating the camera's position adjustment based on calculated speed and camera rotational angle difference from target blade rotational angle; and
    (ii) adjusting the camera's position according to the obtained results of the calculations by sending a signal to the pan-tilt mechanism.

11. The method according to claim 7, comprising further step (ix) of changing location of the camera with rotatable means to another side of the rotating wind turbine blade and repeating the steps (i)-(vi) or (i)-(viii) in new camera's position, such to acquire images of a rotating blade area from all the required sides, selected from the group consisting of the wind turbine blade suction side and pressure side.

12. A method for inspection of rotating wind turbine blade leading edge or trailing edge using the system as per claim 1, the method comprising the following steps:
  (i) positioning and directing camera toward a blade area on a leading edge or a trailing edge, which needs to be inspected, at an angle such that the blade area circular trajectory forms tangent with the camera direction;
  (ii) measuring distance from the camera to the blade area by the at least one laser distance sensor and communicating the data obtained to the computer system;
  (iii) sensing by the at least one laser distance sensor, or a dynamic vision sensors presence of a blade area in the sensor's field of view and communicating the data obtained to the computer system;
  (iv) determining by the computer system the camera's activation time based on the signal received from the laser distance sensor, the laser distance sensors, or the dynamic vision sensors and a pre-set adjustable delay time;
  (v) activating the camera by the computer system to acquire an image of a rotating blade area, which needs to be inspected;
  (vi) processing the images acquired by the camera to determine whether an anomaly is present in the blade area which needs to be inspected.

13. The method according to claim 12, comprising further step (vii) of changing location of the camera with rotatable means to another side of the rotating wind turbine blade and repeating the steps (i)-(vi) in new camera's position, such to acquire images of a rotating blade area from all the required sides, selected from the group consisting of the wind turbine blade leading edge and trailing edge side.

* * * * *

UNITED STATES PATENT AND TRADEMARK OFFICE
CERTIFICATE OF CORRECTION

PATENT NO. : 12,073,547 B1
APPLICATION NO. : 18/687153
DATED : August 27, 2024
INVENTOR(S) : Janis Putrams Page 1 of 1

It is certified that error appears in the above-identified patent and that said Letters Patent is hereby corrected as shown below:

In the Claims

Column 6, Line 46, Claim 8:
After "before the step"
Insert -- of (v) --.

Signed and Sealed this
Twenty-seventh Day of May, 2025

Coke Morgan Stewart
*Acting Director of the United States Patent and Trademark Office*